US011791489B2

(12) United States Patent
Kender

(10) Patent No.: US 11,791,489 B2
(45) Date of Patent: Oct. 17, 2023

(54) REVERSE POLARITY REFRESH METHOD AND REDOX FLOW BATTERY SYSTEM

(71) Applicant: UOP LLC, Des Plaines, IL (US)

(72) Inventor: William T. Kender, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 7 days.

(21) Appl. No.: 17/643,466

(22) Filed: Dec. 9, 2021

(65) Prior Publication Data

US 2022/0200035 A1    Jun. 23, 2022

Related U.S. Application Data

(60) Provisional application No. 63/129,036, filed on Dec. 22, 2020.

(51) Int. Cl.
*H01M 8/18* (2006.01)

(52) U.S. Cl.
CPC .... *H01M 8/188* (2013.01); *H01M 2300/0091* (2013.01)

(58) Field of Classification Search
CPC ..................................................... H01M 8/188
See application file for complete search history.

(56) References Cited

U.S. PATENT DOCUMENTS

| 5,422,197 | A | 6/1995 | Zito | |
|---|---|---|---|---|
| 2014/0186731 | A1* | 7/2014 | Pham | H01M 8/188 429/429 |
| 2014/0193673 | A1* | 7/2014 | Woolery | H01M 8/188 429/105 |
| 2015/0162633 | A1* | 6/2015 | Trudeau, Jr. | H01M 8/20 429/409 |

FOREIGN PATENT DOCUMENTS

JP        2004265821 A     9/2004

OTHER PUBLICATIONS

International Search report from corresponding PCT application No. PCT/US2021/073079, dated Mar. 31, 2022.
Written Opinion from corresponding PCT application No. PCT/US2021/073079, dated Mar. 31, 2022.
Wei, L. et al., Enhanced cycle life of vanadium redox flow battery via a capacity and energy efficiency recovery method, Journal of Power Sources 48 (2020), 228725.

* cited by examiner

*Primary Examiner* — Stewart A Fraser

(57) ABSTRACT

A redox flow battery system comprising a catholyte in fluid communication with a cathode, an anolyte in fluid communication with an anode, a membrane in fluid communication with the catholyte and the anolyte, and positive and negative terminals in contact with a power supply and a load. The positive and negative terminals configured to charge the redox flow battery in an opposite direction such that the anolyte is oxidized and the catholyte is reduced. The anolyte and the catholyte are kept separate and never mixed.

18 Claims, 11 Drawing Sheets

REVERSE POLARITY REFRESH METHOD AND REDOX FLOW BATTERY SYSTEM

RELATED APPLICATIONS

This application claims priority to U.S. Provisional Patent Application Ser. No. 63/129,036 filed on Dec. 22, 2020, the entirety of which is incorporated herein by reference.

FIELD OF THE INVENTION

This invention relates generally to redox flow battery systems and methods of refreshing such systems.

BACKGROUND OF THE INVENTION

Aqueous redox flow batteries with sufficiently high charging voltages suffer from unavoidable side reactions during charging. This happens in acidic all-vanadium flow batteries (VFBs) and all-iron flow batteries (IFBs) via the formation of $H_2$ gas on the negative side. Left unchecked, this parasitic side reaction raises the pH in the negative electrolyte to unsustainable levels. Ultimately, in IFBs this leads to the precipitation of iron hydroxide salts on the negative side which are detrimental to the performance of the battery. Eventually, such batteries store less charge (if any at all), and the total concentration of available iron on the negative side is reduced. These salts are persistent at high pH but can be redissolved at lower pH.

Due to the normal operation of a redox flow battery, the electrolyte compositions deviate from the initial formulations. There are established literature methods to correct these deviations, but each have detriments. This has led to the suggestion in the literature of a method of combining the positive and negative electrolytes. This, can lower the pH, dissolve the iron salts, and set the system back at equilibrium. However, this assumes that the starting compositions of the positive and negative electrolyte are identical, and that there is an efficient method to mix the electrolytes within the battery. This method for refreshing the battery will preclude the use of selective additives on each side of the battery (such as boric selectively used as a plating additive on the negative side).

SUMMARY

The present invention provides new methods for refreshing redox flow battery systems.

Therefore, the present invention may be characterized, in at least one aspect, as providing a process for refreshing a redox flow battery system, the process comprising: providing a redox flow battery, the redox flow battery comprising: a set of terminals connectable to a power supply and a load; a catholyte in fluid communication with a cathode; an anolyte in fluid communication with an anode; and a membrane in fluid communication with the catholyte and the anolyte; partially discharging the redox flow battery; reversing polarity of the set of terminals of the redox flow battery; and charging the redox flow battery in an opposite direction such that the anolyte is oxidized and the catholyte is reduced.

A second aspect of the invention is a process for refreshing a redox flow battery system, the process comprising: providing a redox flow battery, the redox flow battery comprising: a set of terminals connectable to a power supply and a load; a catholyte in fluid communication with a cathode; an anolyte in fluid communication with an anode; and a membrane in fluid communication with the catholyte and the anolyte; partially discharging the redox flow battery; and charging the redox flow battery in an opposite direction such that the anolyte is oxidized and the catholyte is reduced, and wherein the anolyte and the catholyte are kept separate and never mixed.

A third aspect of the invention is A redox flow battery system comprising: a catholyte in fluid communication with a cathode; an anolyte in fluid communication with an anode; a membrane in fluid communication with the catholyte and the anolyte; and positive and negative terminals in contact with a power supply and a load, the positive and negative terminals configured to charge the redox flow battery in an opposite direction such that the anolyte is oxidized and the catholyte is reduced, and wherein the anolyte and the catholyte are kept separate and never mixed.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures.

DETAILED DESCRIPTION OF THE INVENTION

Figure 1:
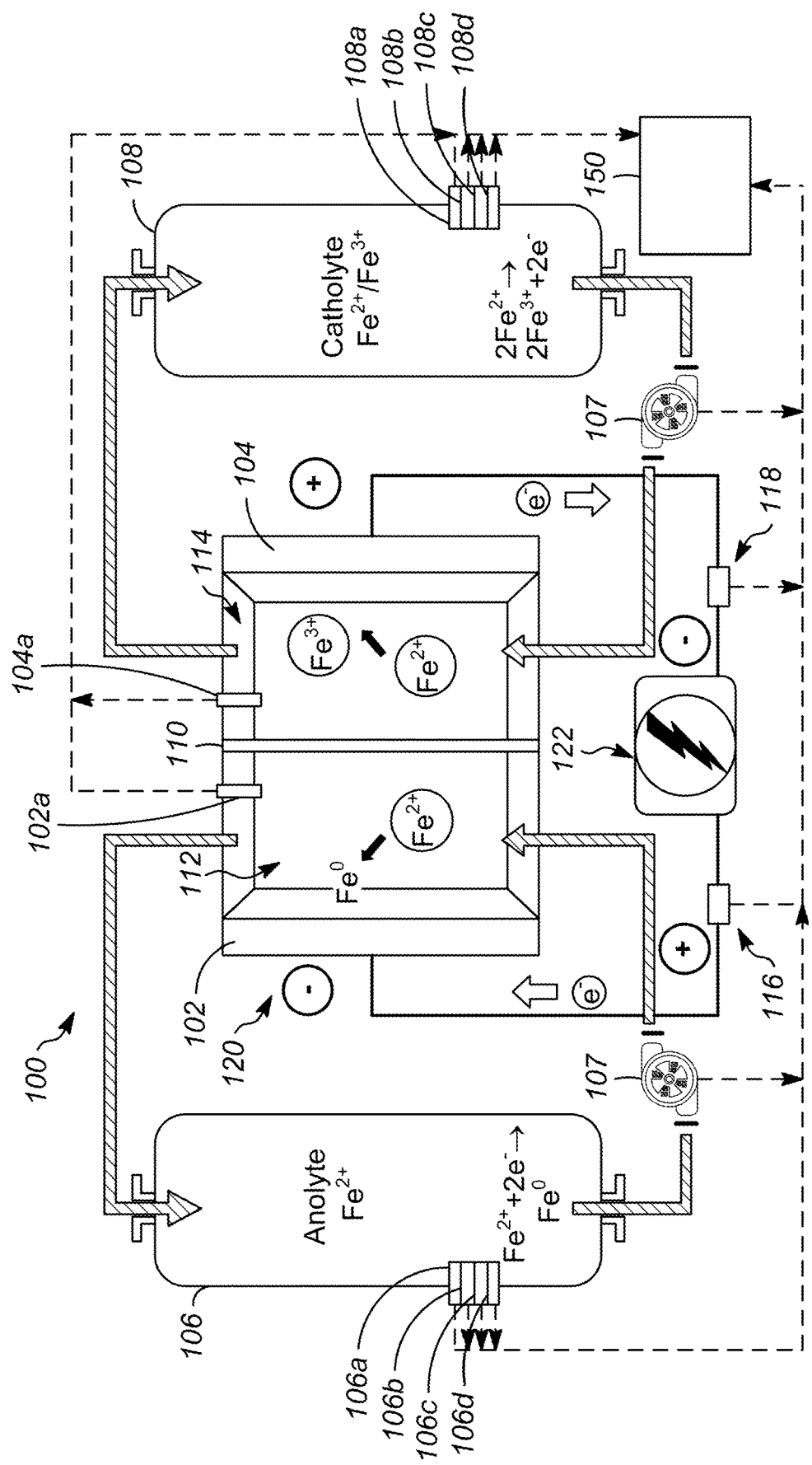
FIG. 1 shows a charging state of a redox flow battery system according to an embodiment of the present disclosure.

This novel method of refreshing a battery charges the battery partially in reverse. In our battery, this allows for the lowering of the negative pH to redissolve precipitated iron salts without the mixing of electrolyte solutions. It also allows for the balancing of supporting electrolytes which become imbalanced over the course of normal operation.

The reverse polarity refresh accomplishes the goal of equilibrating the battery without the need for mixing solutions. The battery is first fully discharged—at this point the battery is at a different composition than the starting conditions due to parasitic side reactions. The battery is then charged in the reverse direction by plating iron in the "positive" side and creating $Fe^{3+}$ in the "negative" side. This has three major effects which improve the long-term performance of the battery: (1) the $Fe^{3+}$ in the negative side dramatically lowers the pH which acts to redissolve the iron salts and any iron flakes which are inaccessible otherwise; (2) charging in the reverse direction helps to rebalance the sodium and proton concentrations; and (3) the $Fe^{3+}$ in the negative side can comproportionate with any $Fe^0$ which has flaked off of the anode. Certain cation exchange membranes, which are used commonly in RFBs, are prone to exhibit a "sodium swing" where upon charging sodium selectively moves sodium ions from the positive electrolyte into the negative electrolyte. Even during long periods of inactivity, this imbalance is not corrected by diffusion. The reverse polarity refresh is able to at least partially mitigate these effects.

Another technique used to try to bring the battery close to equilibrium is the "low voltage hold" where the battery is held at a low voltage to clean off the electrode surface. While this can remove iron salts on the surface of the electrode, it is unable to affect the pH of the negative electrolyte and it is unable to affect any iron species which has flaked off. The reverse polarity refresh does not have either of these limitations.

This invention is unique due to its ability to re-equilibrate the battery without the mixing of solutions. As previously stated, this allows for the selective addition of components to each side without having to screen out components which will only work on one side. A good example of this is in the use of ascorbic acid as a membrane enhancing agent. On the positive side, it can act to protect the membrane from $Fe^{3+}$, but on the negative side it will decrease the pH to a great extent and ultimately lead to $H_2$ generation and low coulombic efficiencies. If the traditional literature methods of refresh are used, the ascorbic cannot be maintained on the positive side alone. The mixing results in the redistribution of this additive.

The reverse polarity refresh is able to extend the life of the battery and to improve its coulombic efficiency (CE). This is due to its ability to enforce an equilibrium after the electrolyte compositions have deviated. By careful use of this method, the optimal electrolyte formulations can be maintained resulting in an increase in the battery longevity by preventing the common mechanisms of battery degradation such as sodium build up, iron salt build up, and loss of state of charge (SoC).

The invention provides a technical differentiator in that it allows for a refresh method which uses only voltage to correct deviations as opposed to the physical mixing of components. For example, in all-vanadium redox flow batteries, the electrolytes are fully mixed in order to refresh a battery. This requires the addition of a physical mechanism which can both mix and separate these electrolyte tanks. This invention, by contrast, is able to achieve similar beneficial effects (essentially resetting starting concentrations), but by using only voltage which requires less additional equipment.

The subject matter of the instant application was invented in response to a direct need to find an effective refresh method for IFBs without the active mixing of the electrolytes. Redox flow battery systems can have solution chemistries which dictate that the positive and negative electrolytes should not mix for optimal performance. In the illustrated embodiment, the redox flow battery comprises ascorbic acid in the catholyte only. This means that the established methods would be incompatible with such batteries. A useful feature of the instant reverse polarity refresh system is that the anolyte and the catholyte are kept separate and never need to be mixed.

Redox Flow Battery System

As shown in FIG. 1, an embodiment of the redox flow battery system 100. The redox flow battery comprises an anode 102, a cathode 104, an anolyte 106, a catholyte 108, and an ion-selective membrane 110. The ion-selective membrane 110 provides a semipermeable membrane between the anolyte 106 and the catholyte 108 in the anolyte portion and the catholyte portion of the battery. Pumps 107 introduce and recirculate the anolyte 106 to the anode portion 112 and the catholyte 108 to the cathode portion 114 of the battery system 100, respectively. In the illustrated embodiment the redox flow battery 120 operates at an ambient temperature of about 25 Celsius and a pressure of about 100 kPa or about 1 bar.

In the illustrated embodiments, the anolyte and the catholyte are aqueous and may also comprise solvents such as acetonitrile. In the illustrated embodiment of FIG. 1, the anolyte comprises iron (II), $Fe^{2+}$. In other contemplated embodiments, anolyte comprises $Fe^0$ particles, $Fe^{2+}$, $Cr^{2+}$, $Cr^{3+}$, $Sn^{2+}$, $Sn^{4+}$, $Mn^{2+}$, $Mn^{4+}$, $Ce^{2+}$, $Ce^{3+}$, or $V^{3+}$. In the illustrated embodiment of FIG. 1, the catholyte comprises iron (III), $Fe^{3+}$. In other contemplated embodiments, anolyte comprises $Fe^{2+}$, $Fe^{3+}$, $V^{4+}$, or $V^{5+}$.

During charging, the terminals 116, 118 of the battery 120 are in contact with a power source 122 such as solar panels or a grid. In the illustrated embodiment, the first terminal 116 is positive and the second terminal 118 is negative. Electrons flow from the power supply 122 toward the anode 102. The reaction in the anolyte comprises $Fe^{2+}+2e^-\rightarrow Fe^0$. The reaction in the catholyte comprises $2Fe^{2+}+\rightarrow 2Fe^{3+}+2e^-$.

Additionally, there is no need for this refresh method to be limited to IFBs. Any redox active system which has symmetrical components or starts from a moderate oxidation state could be used. For example, VFBs could use this method to refresh their systems, as could any system which starts in a state where oxidation and reduction are both possible from the discharged state.

The battery 120 is run in normal operation for a number of cycles. The reverse polarity refresh is then initiated when certain criteria are met. For example, the performance has deteriorated by a certain extent (say a reduction in % CE) or the internal metrics provide results which suggest that there is an imbalance of concentrations of components relative to the starting condition.

In certain embodiments, the pH levels of anolyte 106 and the catholyte 108 are monitored via probes 106a and 108a. The pH probes 106a, 108a can measure pH of the anolyte and the catholyte in holding tanks or in the anolyte and catholyte portions 112, 114 of the battery 120. Redundant probes 102a, 104a are provided in the battery 120 as shown in FIG. 1. Also provided are reference electrodes 106b, 108b, conductivity meters 106c, 108c, and pressure sensors 106d, 108d. The pH probes 106a, 108a, reference electrodes 106b, 108b, conductivity meters 106c, 108c, and pressure sensors 106d, 108d feed data to the control system 150 for monitoring and controlling the battery system 100. In the illustrated embodiment, electrolyte concentration can be monitored via a conductivity meter 106c, 109c. The concentration of $Fe^{3+}$ may also be measured using a reference electrode 108b. Charge imbalance, open cell voltage, and state of charge of the battery system 100 are monitored by the control system 150.

The refresh is performed by fully discharging the battery until the amount of current yielded at 0V is low: such as at a current density of <1 mA/cm2. Then, the battery is charged in reverse. This can be done manually, via the swapping of the leads, or programmatically.

The charging is done at a relatively mild current density—such as ⅓ or ¼ the forward charging density—and is done for a length of time which is dictated by the system being charged. For example, if there is a substantial amount of iron salt built up on the negative side the reverse polarity refresh would be allowed to continue for a longer time, than if the refresh were initiated when there was only a small deviation from the initial conditions. The end point of the refresh can be determined by a number of methods: (1) monitoring of OCV (reverse direction) can be done periodically to see if the plated iron is persistent on the cathode portion 114, or if the $Fe^{3+}$ is persistent on the anode portion 112 of the battery. If there is persistent $Fe^{3+}$ on the negative side, this indicates that a majority of the iron salts have been consumed (or the reaction rate of consumption is sufficiently low) and the refresh can be stopped. (2) monitoring of pH can be used to watch the buildup of $Fe^{3+}$ on the negative side. As the $[Fe^{3+}]$ increases, the pH should decline. When it reaches a predetermined level (such as the starting pH for the negative side—anode portion 112) the refresh can be terminated. Finally, the battery 120 is set to 0V to extract any lingering reverse current. Then the battery 120 is charged as normal again. The process can be initiated after a set number of cycles, or after a certain internal metric is reached (decline in % CE, increase in pH, mass of iron salts in electrolyte tank). Accumulation of precipitated iron is monitored by a particle detector (not shown).

Figure 2:
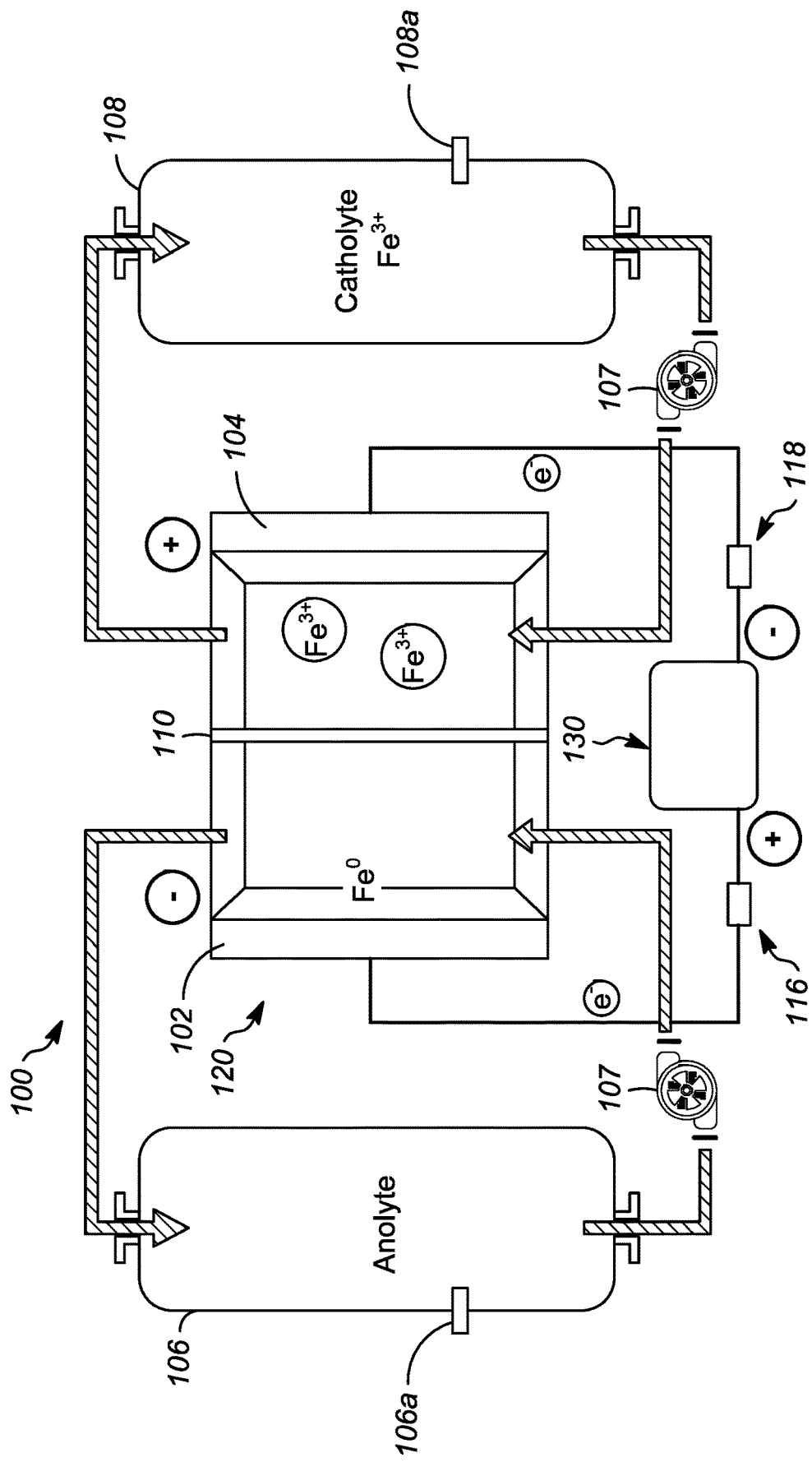
FIG. 2 shows a charged state of the redox flow battery system embodiment shown in FIG. 1.

FIG. 2 shows all iron redox flow battery 120 in a charged state. In the charged state, iron is plated onto the anode 102 and $Fe^{3+}$ is present in the catholyte 108. In the charged state the terminals 116, 118 may be connected to a load 130 configured to draw electricity from the battery system 100.

Figure 3:
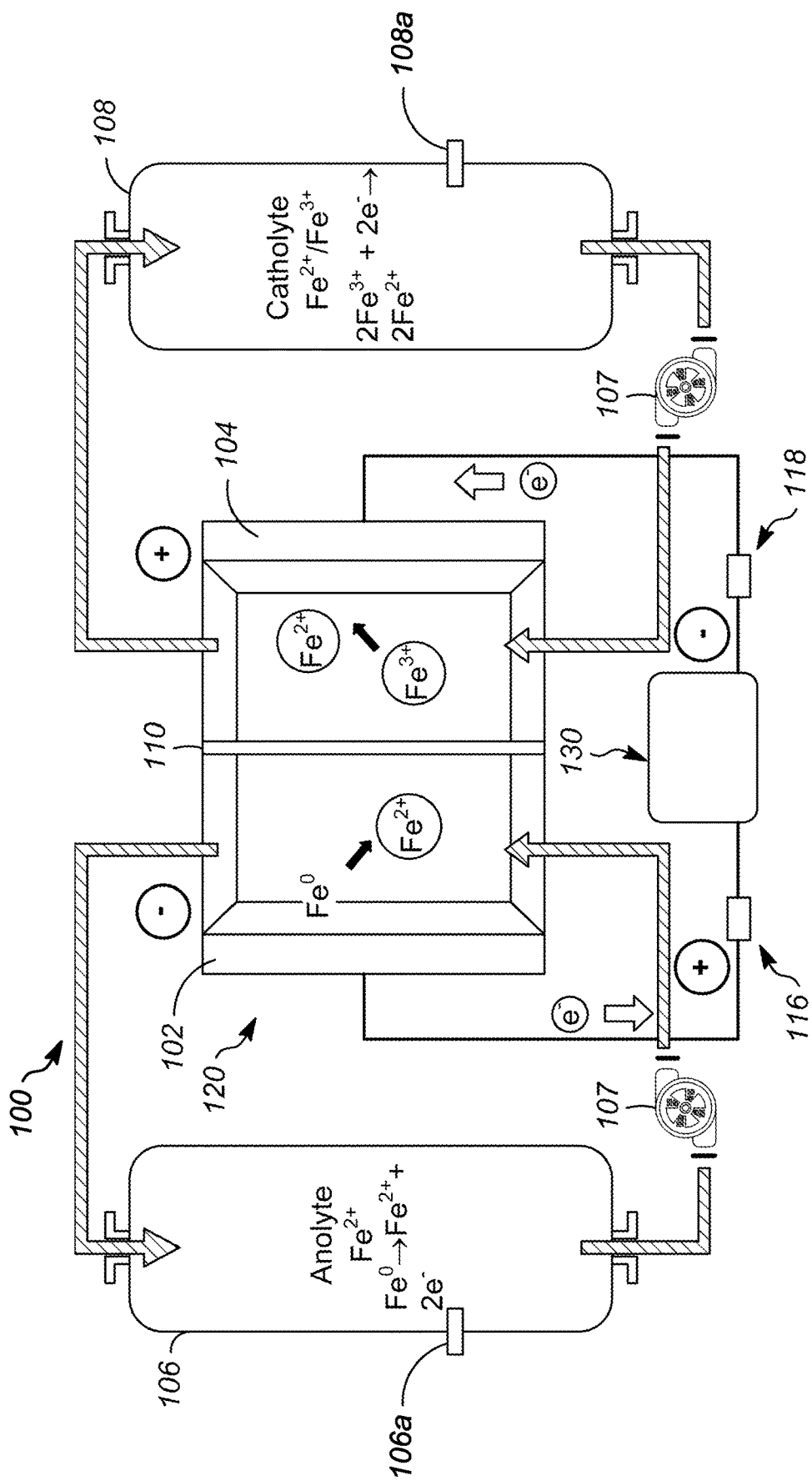
FIG. 3 shows a discharging state of the redox flow battery according to the embodiment shown in FIG. 1.

FIG. 3 shows the discharging state of the iron redox flow battery system 100. The terminals 116, 118 are connected to a load 130, which partially discharges the redox flow battery. Partially discharging the redox flow battery may occur until the redox flow battery has an open cell voltage of about 0.2 V. More preferably, discharging will draw down the battery to an open cell voltage of about 0.1 V or less. The reaction in the anolyte comprises: $Fe^0 \rightarrow Fe^{2+}+2e^-$ and the reaction in the catholyte comprises: $2Fe^{3+}+2e^- \rightarrow 2Fe^{2+}$.

Figure 4:
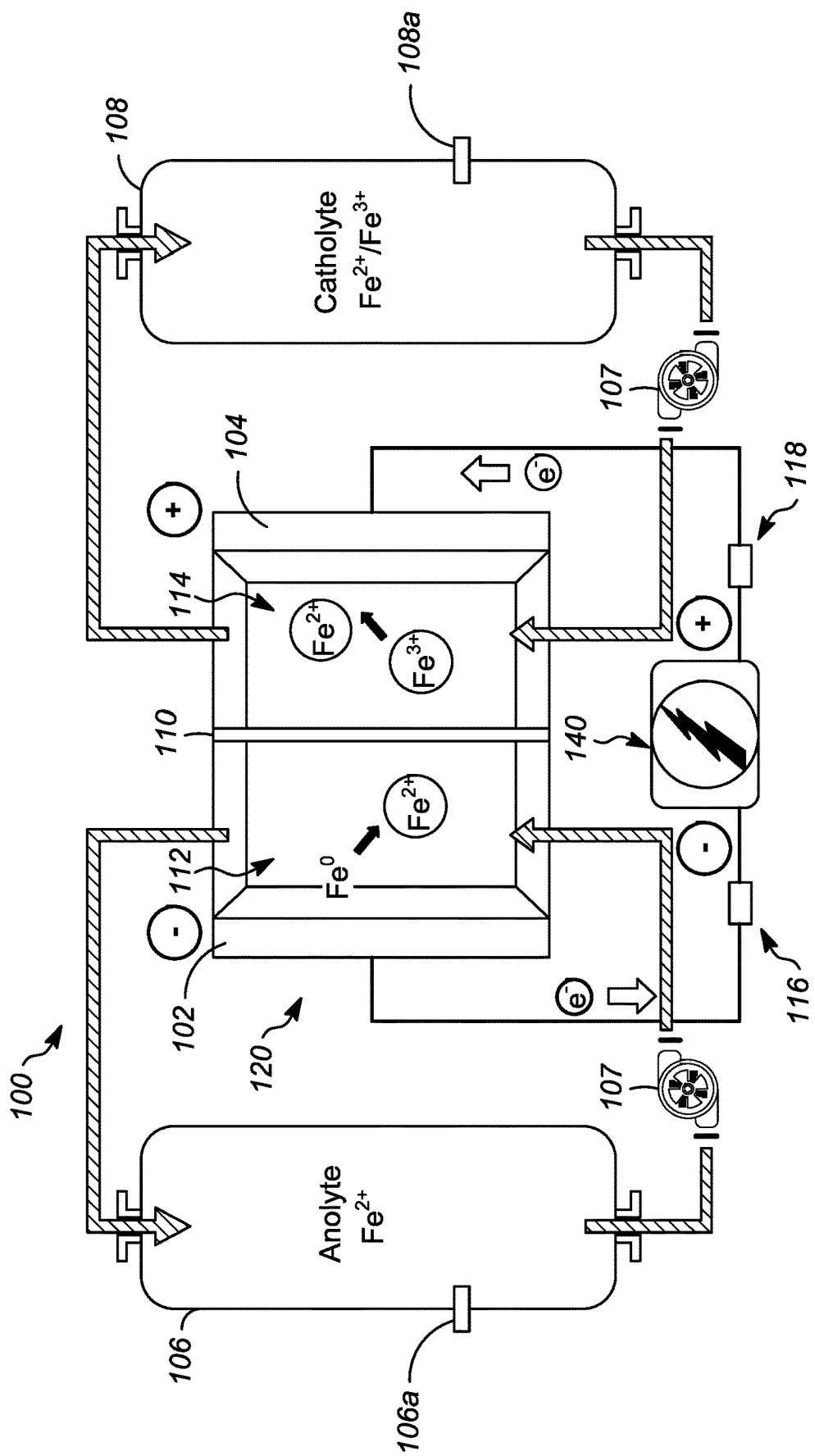
FIG. 4 shows a reverse charging state of the redox flow battery according to an embodiment of the present invention.

FIG. 4 shows the reverse charging state of the iron redox flow battery system 100. The power supply 140 in the illustrated embodiment is configured to charge the battery 120 in the opposite direction as the forward charging shown in FIG. 1. In the illustrated embodiment, the first terminal 116 is negative and the second terminal 118 is positive. Electrons flow from the power supply 140 toward the cathode 104.

The step can occur by reversing polarity of the set of terminals 116, 118 of the redox flow battery 120 and charging the redox flow battery 120 in an opposite direction such that the anolyte is oxidized and the catholyte is reduced. This step is carried out by the control system 150 (See FIG. 1).

Figure 5:
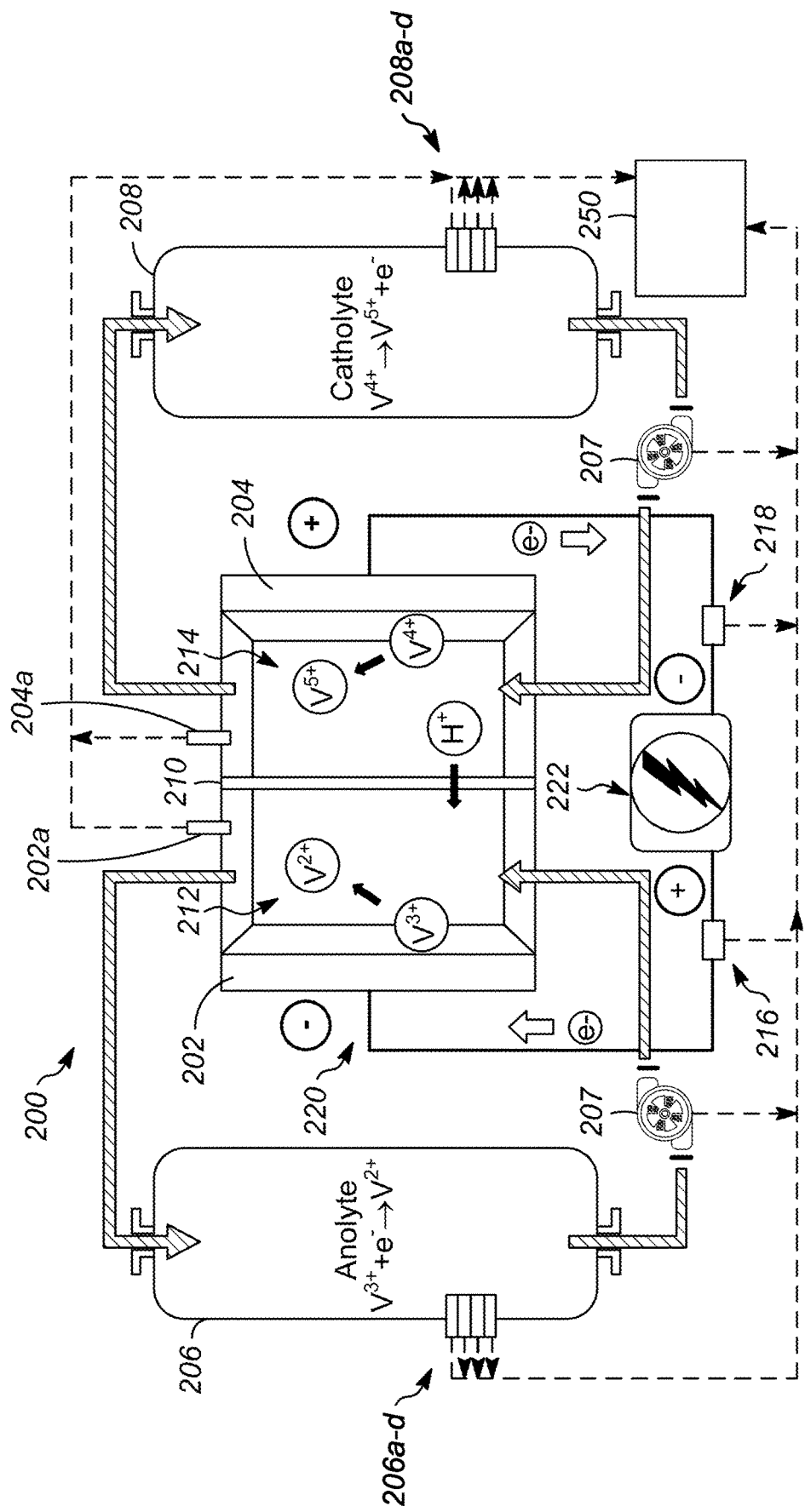
FIG. 5 shows a charging state of the redox flow battery according to a second embodiment of the present disclosure.

FIG. 5 shows charging state of a second embodiment of the redox flow battery system 200 which is an all-vanadium redox flow battery 220. In the second embodiment, similar structures from the first embodiment are given similar reference numerals. The battery 220 comprises an anode 202, a cathode 204, and an ion-selective membrane 210. The ion-selective membrane 210 provides a semipermeable membrane between the anolyte 206 and the catholyte 208 in the anolyte portion and the catholyte portion of the battery.

Pumps 207 introduce and recirculate the anolyte 206 to the anode portion 212 and the catholyte 208 to the cathode portion 214 of the battery system 200, respectively.

The pH probes 206a, 208a can measure pH of the anolyte and the catholyte in holding tanks or in the anolyte and catholyte portions 212, 214 of the battery 220. Redundant probes 202a, 204a are provided in the battery 220. Also provided are reference electrodes 206b, 208b, conductivity meters 206c, 208c, and pressure sensors 206d, 208d. The pH probes 206a, 208a, reference electrodes 206b, 208b, conductivity meters 206c, 208c, and pressure sensors 106d, 108d feed data to the control system 250 for monitoring and controlling the battery system 200.

During charging, the terminals 216, 218 of the battery 220 are in contact with a power source 222 such as solar panels or a grid. In the illustrated embodiment, the first terminal 216 is positive and the second terminal 218 is negative. Electrons flow from the power supply 222 toward the anode 202.

The reaction in the anolyte comprises: $V^{3+}+e^- \rightarrow V^{2+}$. The reaction in the catholyte comprises: $V^{4+} \rightarrow V^{5+}+e^-$. In the illustrated embodiment, the anolyte 206 comprises vanadium (II), $V^{2+}$. And the catholyte 208 comprises vanadium (V), $V^{5+}$.

Figure 6:
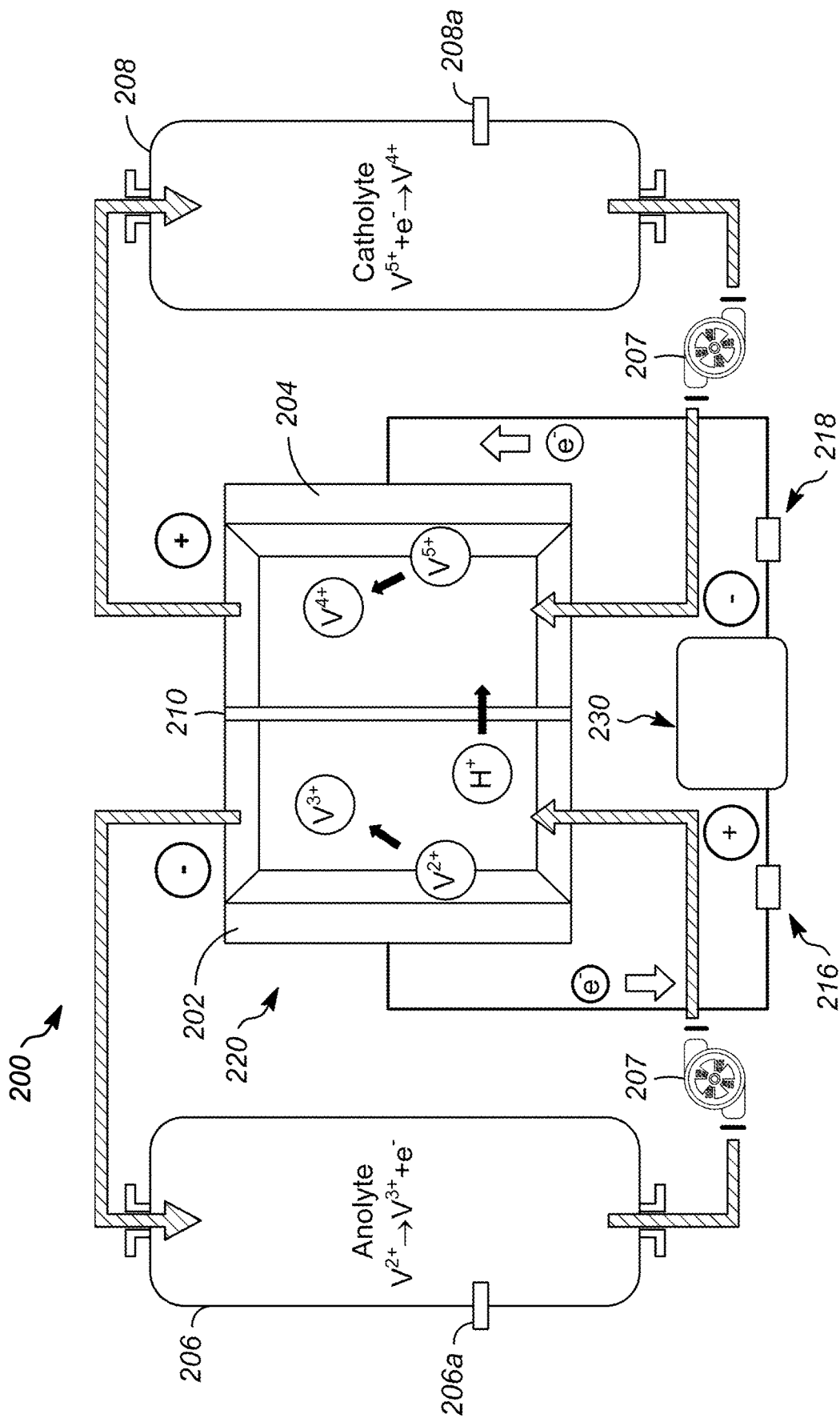
FIG. 6 shows a discharging state of the redox flow battery system of FIG. 5.

FIG. 6 shows a discharging state of the vanadium redox flow battery 220. The reaction in the in the anolyte comprises $V^{2+} \rightarrow V^{3+}+e^-$. The reaction in the catholyte comprises $V^{5+}+e^- \rightarrow V^{4+}$.

Figure 7:
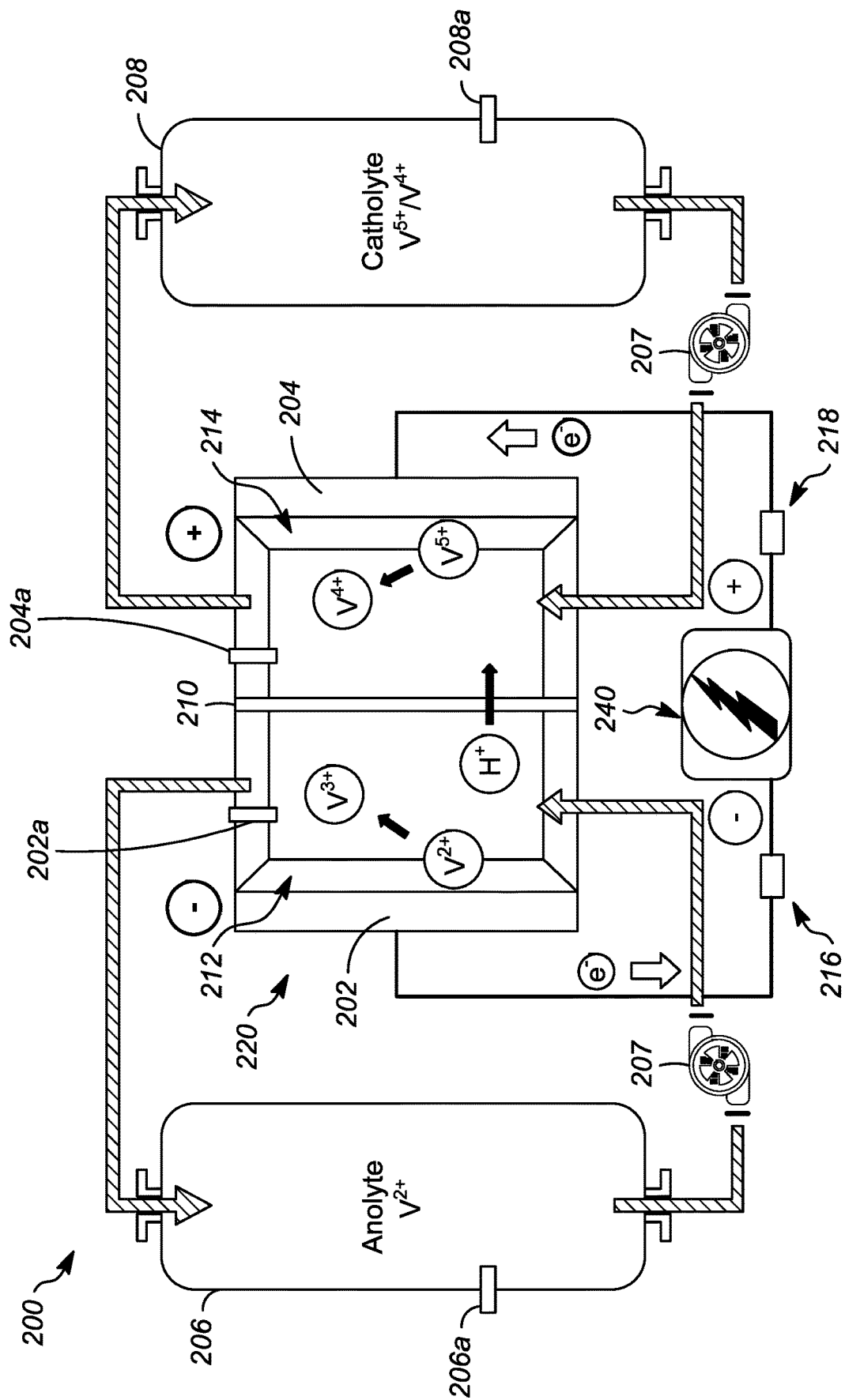
FIG. 7 shows a reverse charging state of the redox flow battery according to a second embodiment of the present invention according to an embodiment of the present disclosure.

FIG. 7 shows the reverse charging state of the vanadium redox flow battery 220. The power supply 240 in the illustrated embodiment is configured to charge the battery 220 in the opposite direction as the forward charging shown in FIG. 5. In the anode portion 212 of the battery, the reaction comprises $V^{2+} \rightarrow V^{3+}+e^-$. In the cathode portion 214, the reaction comprises $V^{5+}+e^- \rightarrow V^{4+}$. The step can occur by reversing polarity of the set of terminals 216, 218 of the redox flow battery 220 and charging the redox flow battery 220 in an opposite direction such that the anolyte 206 is oxidized and the catholyte 208 is reduced. This step is carried out by the control system 250.

Refresh Process

Figure 8:
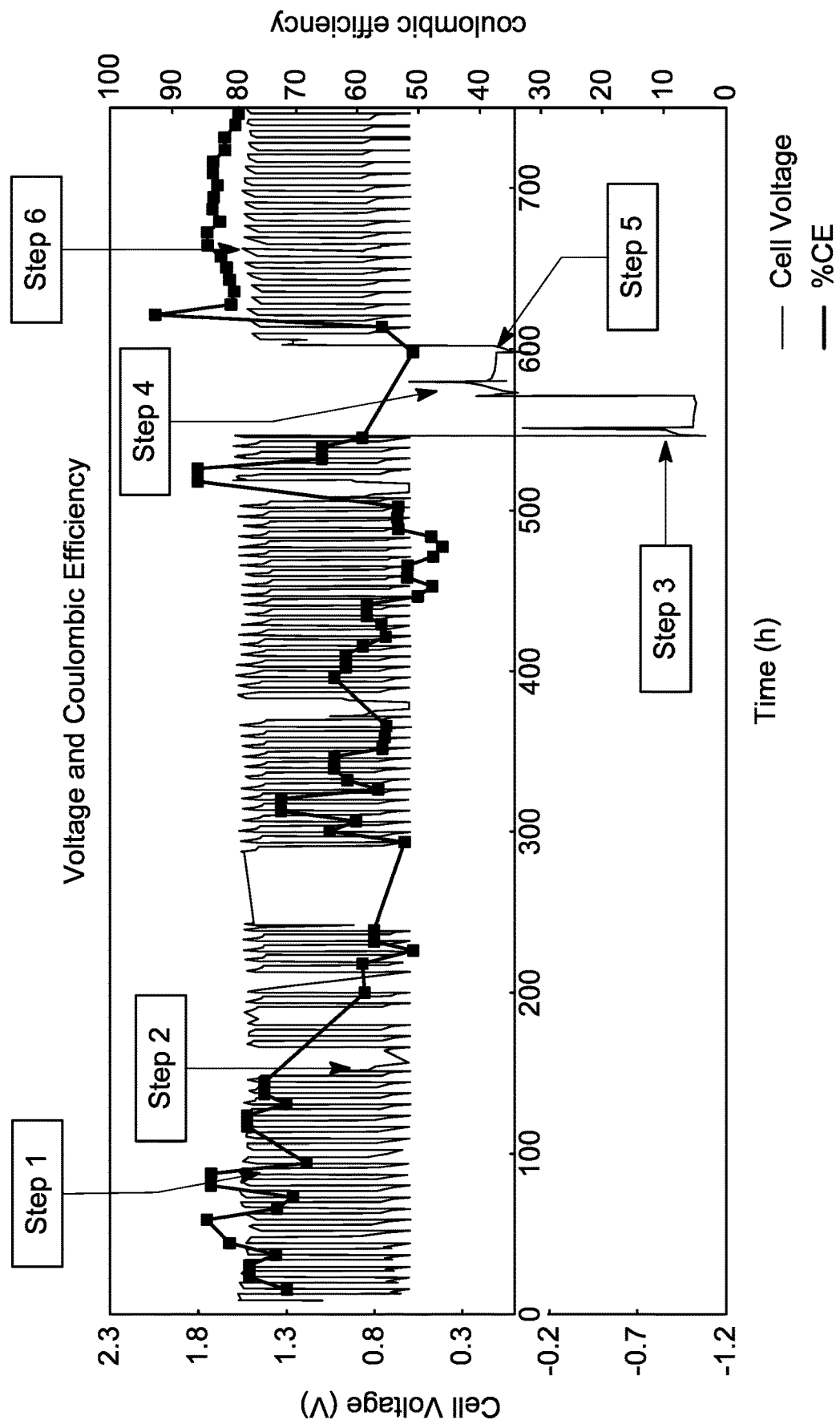
FIG. 8 shows a reverse polarity refresh process according to an embodiment of the present invention.

FIG. 8 shows an embodiment of the reverse polarity refresh process.

Step 1) Normal operation of battery causes imbalance of electrolyte concentrations and leads to an increased pH on negative side.

Step 2) Iron precipitates out as inactive iron salts. This decreases Coulombic Efficiency and results in poor plating.

Step 3) The battery is fully discharged.

Step 4) The battery is charged in reverse to generate $Fe^{3+}$ on negative side and $Fe^0$ on positive side.

Step 5) The lowered pH in negative side redissolves inactive iron salts.

Step 6) Normal operation of the battery resumes but with a greatly improved % CE and better plating.

The reverse polarity refresh (steps 3-6) could begin based upon low CE, high pH, supporting electrolyte imbalance, or state of charge imbalance. In one embodiment, the reverse polarity refresh could occur when the CE of the battery reaches below about 50% and the reverse charging could restore the CE of the battery to about 85% or more. In another embodiment, the reverse polarity refresh could occur when the pH of the anolyte reaches about 5.0 and the reverse charging could lower the pH of the anolyte to about 1.0.

After a number of cycles, a state of charge drift may occur in the battery system. Other problems that may be detected include an uncontrollable pH rise, or increased membrane resistance. Iron precipitation on the membrane can be determined via an increase in high frequency resistance. Electrochemical impedance can be measured by applying an AC potential to an electrochemical cell and then measuring the current through the cell.

Figure 9:
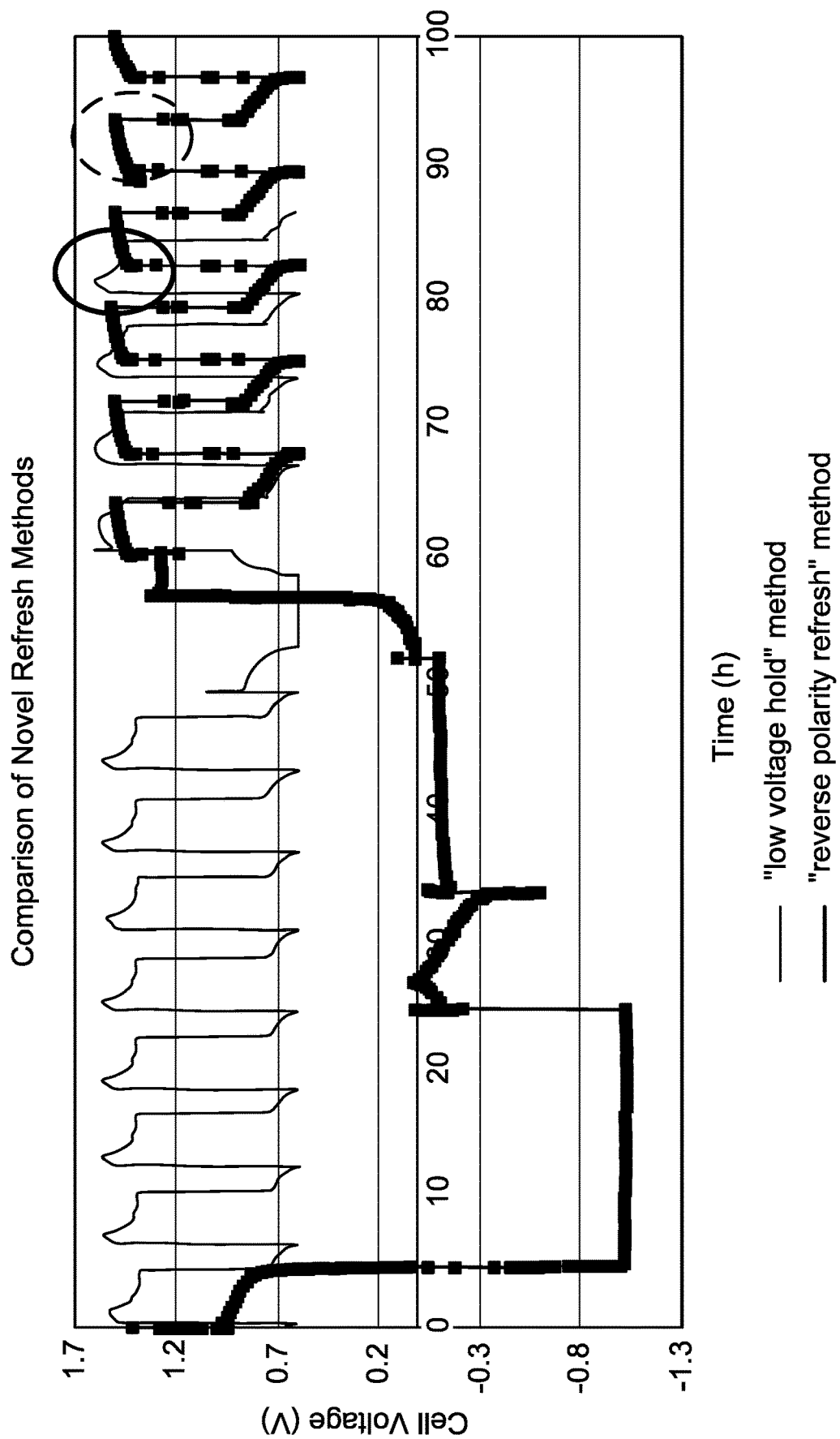
FIG. 9 shows a comparison of the reverse polarity refresh and a low voltage hold refresh method.

FIG. 9 shows the charging characteristics after a refresh.

The gray trace is the cell voltage vs time of before and after a "low voltage hold" refresh. This refresh method is common in literature to clean off an electrode. Both before and after the refresh, there is an increase in voltage early in the charging cycle—the curve appears to "peak" early. This is indicative of a poorly performing electrochemical cell. The solid oval in FIG. 9 shows the early charging peak of the low voltage hold method.

The black trace is the cell voltage after a reverse polarity refresh. The voltage performance shows the expected and most productive charging behavior characterized by a slight rise over the course of a charge. The dashed oval in FIG. 9 shows the steady voltage increase of the reverse polarity refresh method.

Of note is that the discharge for the reverse polarity refresh method lasts longer and results in a higher % CE.

Figure 10:
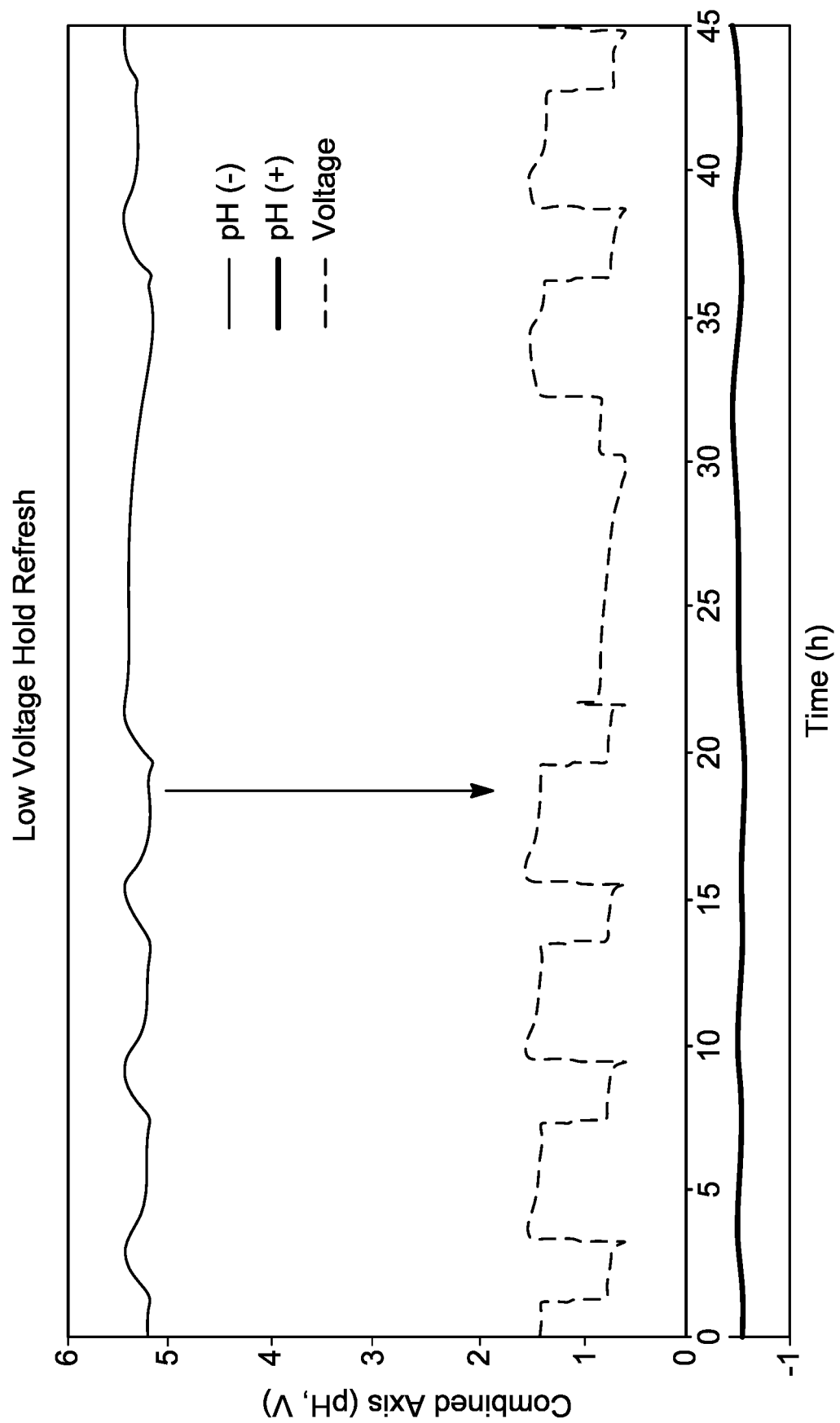
FIG. 10 shows the battery chemistry resulting from a low voltage hold refresh method.
Figure 11:
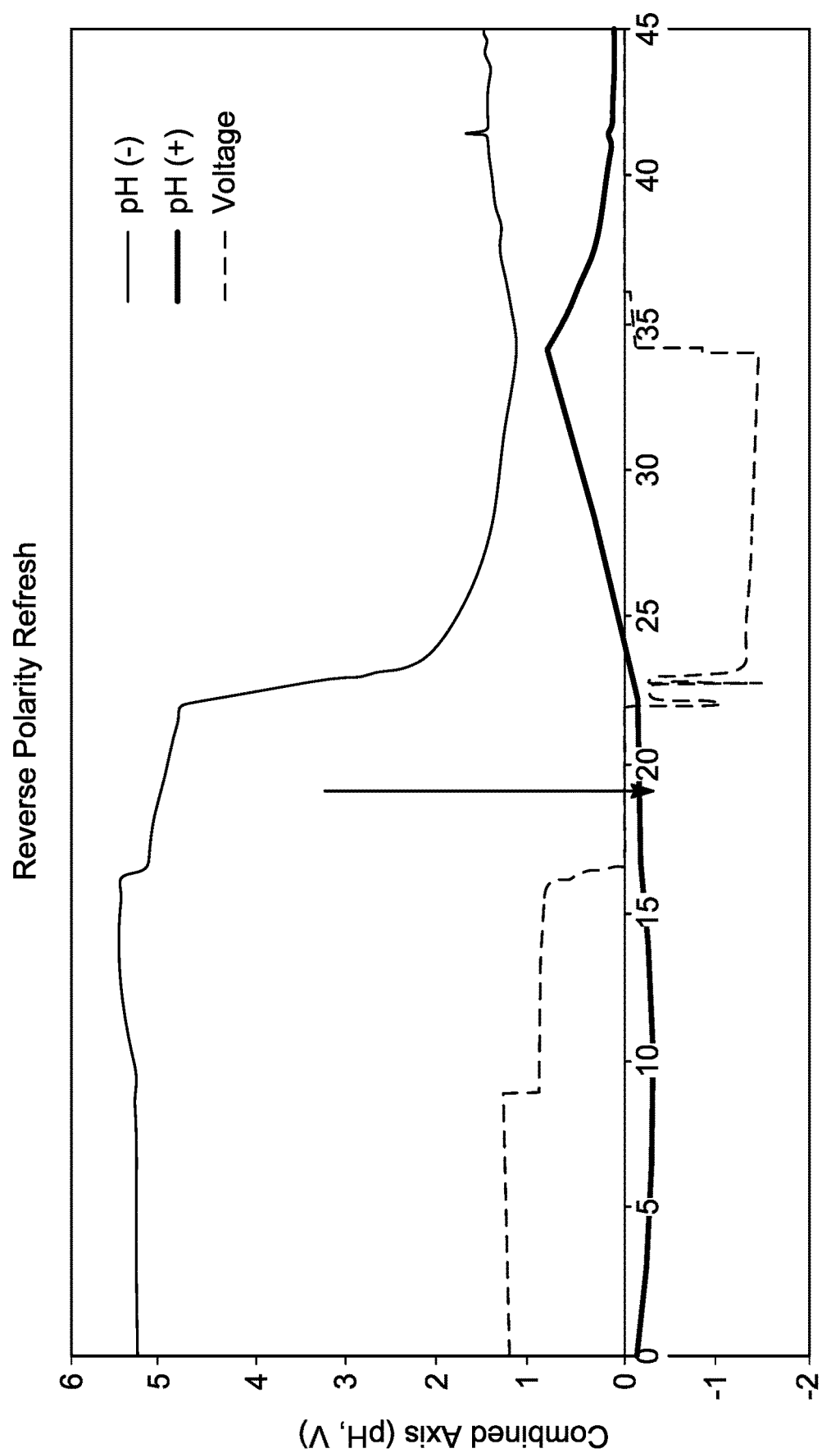
FIG. 11 shows the battery chemistry of a reverse polarity refresh method of the present disclosure.

FIGS. 10 and 11 show battery chemistry comparison of low voltage hold and reverse polarity refresh. FIG. 10 depicts a cell which has undergone a low voltage hold refresh. Of note is that the pH of the negative electrolyte remains near 5 both before and after the refresh.

In contrast, FIG. 11 is a graph that depicts a cell during a reverse polarity refresh, the negative pH is substantially lowered over the duration of the refresh. This allows for the redissolution of the precipitated iron salts.

The black arrows indicate the onset of each refresh cycle.

SPECIFIC EMBODIMENTS

While the following is described in conjunction with specific embodiments, it will be understood that this description is intended to illustrate and not limit the scope of the preceding description and the appended claims.

A first embodiment of the invention is a process for refreshing a redox flow battery system, the process comprising providing a redox flow battery, the redox flow battery comprising a set of terminals connectable to a power supply and a load; a catholyte in fluid communication with a cathode; an anolyte in fluid communication with an anode; and a membrane in fluid communication with the catholyte and the anolyte; partially discharging the redox flow battery; reversing polarity of the set of terminals of the redox flow battery; and charging the redox flow battery in an opposite direction such that the anolyte is oxidized and the catholyte is reduced. An embodiment of the invention is one, any or all of prior embodiments in this paragraph up through the first embodiment in this paragraph, wherein the redox flow battery system comprises an all-iron redox flow battery, an iron-chromium redox flow battery, or an all-vanadium redox flow battery. An embodiment of the invention is one, any or all of prior embodiments in this paragraph up through the first embodiment in this paragraph, wherein discharging occurs when a state of charge imbalance of the battery reaches about 20% difference from the starting conditions and wherein the step of charging the redox flow battery in an opposite direction is conducted until this difference is less than 5%. An embodiment of the invention is one, any or all of prior embodiments in this paragraph up through the first embodiment in this paragraph, wherein discharging occurs when a pH of the anolyte reaches about 5.0 and wherein the step of charging the redox flow battery in an opposite direction is conducted until the pH of the anolyte reaches about 1.0. An embodiment of the invention is one, any or all of prior embodiments in this paragraph up through the first embodiment in this paragraph, wherein the redox flow battery comprises ascorbic acid in the catholyte only. An embodiment of the invention is one, any or all of prior embodiments in this paragraph up through the first embodiment in this paragraph, wherein the catholyte comprises $Fe^{2+}$, $Fe^{3+}$, $V^{4+}$, or $V^{5+}$. An embodiment of the invention is one, any or all of prior embodiments in this paragraph up through the first embodiment in this paragraph, wherein the anolyte comprises $Fe^{0}$ particles, $Fe^{2+}$, $Cr^{2+}$, $Cr^{3+}$, $Sn^{2+}$, $Sn^{4+}$, $Mn^{2+}$, $Mn^{4+}$, $Ce^{2+}$, $Ce^{3+}$, or $V^{3+}$. An embodiment of the invention is one, any or all of prior embodiments in this paragraph up through the first embodiment in this paragraph, wherein the anolyte and the catholyte are kept separate and never mixed. An embodiment of the invention is one, any or all of prior embodiments in this paragraph up through the first embodiment in this paragraph, wherein discharging occurs when a coulombic efficiency of the redox flow battery is below about 80%.

A second embodiment of the invention is a process for refreshing a redox flow battery system, the process comprising providing a redox flow battery, the redox flow battery comprising a set of terminals connectable to a power supply and a load; a catholyte in fluid communication with a cathode; an anolyte in fluid communication with an anode; and a membrane in fluid communication with the catholyte and the anolyte; partially discharging the redox flow battery; and charging the redox flow battery in an opposite direction such that the anolyte is oxidized and the catholyte is reduced, and wherein the anolyte and the catholyte are kept separate and never mixed. An embodiment of the invention is one, any or all of prior embodiments in this paragraph up through the second embodiment in this paragraph, wherein discharging occurs when a coulombic efficiency of the redox flow battery is below about 80%. An embodiment of the invention is one, any or all of prior embodiments in this paragraph up through the second embodiment in this paragraph, wherein the redox flow battery is an all-iron redox flow battery, an iron-chromium redox flow battery, or an all-vanadium redox flow battery. An embodiment of the invention is one, any or all of prior embodiments in this paragraph up through the second embodiment in this paragraph, wherein the catholyte comprises $Fe^{2+}$, $Fe^{3+}$, $V^{4+}$, or $V^{5+}$. An embodiment of the invention is one, any or all of prior embodiments in this paragraph up through the second embodiment in this paragraph, wherein the anolyte comprises $Fe^{0}$ particles, $Fe^{2+}$, $Cr^{2+}$, $Cr^{3+}$ $Sn^{2+}$, $Sn^{4+}$, $Mn^{2+}$, $Mn^{4+}$, $Ce^{2+}$, or $Ce^{3+}$. An embodiment of the invention is one, any or all of prior embodiments in this paragraph up through the second embodiment in this paragraph, wherein a current density of charging the redox flow battery in the opposite direction is between about ¼ to about ⅓ of a current density of charging the redox flow battery in a forward direction.

A third embodiment of the invention is a system comprising a catholyte in fluid communication with a cathode; an anolyte in fluid communication with an anode; a membrane in fluid communication with the catholyte and the anolyte; and positive and negative terminals in contact with a power supply and a load, the positive and negative terminals configured to charge the redox flow battery in an opposite direction such that the anolyte is oxidized and the catholyte is reduced, and wherein the anolyte and the catholyte are kept separate and never mixed. An embodiment of the invention is one, any or all of prior embodiments in this paragraph up through the third embodiment in this paragraph, wherein the redox flow battery system is an all-iron redox flow battery system or an all-vanadium redox flow battery system. An embodiment of the invention is one, any or all of prior embodiments in this paragraph up through the third embodiment in this paragraph, wherein the redox flow battery is configured to be discharged when a state of charge difference of the anolyte reaches about 20% of the starting condition and wherein charging the redox flow battery in the opposite direction is conducted until the concentration of $Fe^{3+}$ in the catholyte is within about 5% of the initial condition. An embodiment of the invention is one, any or all of prior embodiments in this paragraph up through the third embodiment in this paragraph, wherein the redox flow battery is configured to be discharged when a pH of the anolyte reaches about 5.0 and wherein charging the redox flow battery in the opposite direction lowers the pH of the anolyte to about 1.0. An embodiment of the invention is one, any or all of prior embodiments in this paragraph up through the third embodiment in this paragraph, wherein the anolyte or the catholyte comprises ascorbic acid.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least two exemplary embodiments have been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for refreshing a redox flow battery system, the process comprising:
    providing a redox flow battery, the redox flow battery comprising:
        a set of terminals connectable to a power supply and a load;
        a catholyte in fluid communication with a cathode;
        an anolyte in fluid communication with an anode; and
        a membrane in fluid communication with the catholyte and the anolyte;
    partially discharging the redox flow battery;
    reversing polarity of the set of terminals of the redox flow battery; and
    charging the redox flow battery in an opposite direction such that the anolyte is oxidized and the catholyte is reduced; and
    wherein discharging occurs when a pH of the anolyte reaches 5.0 and wherein the step of charging the redox flow battery in an opposite direction is conducted until the pH of the anolyte reaches 1.0.

2. The process of claim 1, wherein the redox flow battery system comprises an all-iron redox flow battery, an iron-chromium redox flow battery, or an all-vanadium redox flow battery.

3. The process of claim 1, wherein discharging occurs when a state of charge imbalance of the battery reaches 20% difference from a starting condition and wherein the step of charging the redox flow battery in an opposite direction is conducted until this difference is less than 5%.

4. The process of claim 1, wherein the redox flow battery comprises ascorbic acid in the catholyte only.

5. The process of claim 1, wherein the catholyte comprises $Fe^{2+}$, $Fe^{3+}$, $V^{4+}$, or $V^{5+}$.

6. The process of claim 5, wherein the anolyte and the catholyte are kept separate and never mixed.

7. The process of claim 1, wherein the anolyte comprises $Fe^0$ particles, $Fe^{2+}$, $Cr^{2+}$, $Cr^{3+}$, $Sn^{2+}$, $Sn^{4+}$, $Mn^{2+}$, $Mn^{4+}$, $Ce^{2+}$, $Ce^{3+}$, or $V^{3+}$.

8. The process of claim 1, wherein discharging occurs when a coulombic efficiency of the redox flow battery is below 80%.

9. A process for refreshing a redox flow battery system, the process comprising:
    providing a redox flow battery, the redox flow battery comprising:
        a set of terminals connectable to a power supply and a load;
        a catholyte in fluid communication with a cathode;
        an anolyte in fluid communication with an anode; and
        a membrane in fluid communication with the catholyte and the anolyte;
    partially discharging the redox flow battery; and
    charging the redox flow battery in an opposite direction such that the anolyte is oxidized and the catholyte is reduced, and wherein the anolyte and the catholyte are kept separate and never mixed; and
    wherein discharging occurs when a pH of the anolyte reaches 5.0 and wherein the step of charging the redox flow battery in an opposite direction is conducted until the pH of the anolyte reaches 1.0.

10. The process of claim 9, wherein discharging occurs when a coulombic efficiency of the redox flow battery is below 80%.

11. The process of claim 9, wherein the redox flow battery is an all-iron redox flow battery, an iron-chromium redox flow battery, or an all-vanadium redox flow battery.

12. The process of claim 9, wherein the catholyte comprises $Fe^{2+}$, $Fe^{3+}$, $V^{4+}$, or $V^{5+}$.

13. The process of claim 9, wherein the anolyte comprises $Fe^0$ particles, $Fe^{2+}$, $Cr^{2+}$, $Cr^{3+}$ $Sn^{2+}$, $Sn^{4+}$, $Mn^{2+}$, $Mn^{4+}$, $Ce^{2+}$, or $Ce^{3+}$.

14. The process of claim 9, wherein a current density of charging the redox flow battery in the opposite direction is between ¼ to about ⅓ of a current density of charging the redox flow battery in a forward direction.

15. A redox flow battery system comprising:
    a catholyte in fluid communication with a cathode;
    an anolyte in fluid communication with an anode;
    a membrane in fluid communication with the catholyte and the anolyte;
    positive and negative terminals in contact with a power supply and a load, the positive and negative terminals configured to charge the redox flow battery in an opposite direction such that the anolyte is oxidized and the catholyte is reduced, and wherein the anolyte and the catholyte are kept separate and never mixed;

wherein the redox flow battery is configured to be discharged when a pH of the anolyte reaches 5.0 and wherein charging the redox flow battery in the opposite direction lowers the pH of the anolyte to 1.0.

16. The redox flow battery system of claim 15, wherein the redox flow battery system is an all-iron redox flow battery system or an all-vanadium redox flow battery system.

17. The redox flow battery system of claim 16, wherein the anolyte or the catholyte comprises ascorbic acid.

18. The redox flow battery system of claim 15, wherein the redox flow battery is configured to be discharged when a state of charge difference of the anolyte reaches 20% of the starting condition and wherein charging the redox flow battery in the opposite direction is conducted until the concentration of $Fe^{3+}$ in the catholyte is within about 5% of the initial condition.

* * * * *